July 20, 1943. J. W. HATCH 2,324,979
AIRPLANE BRAKE
Filed April 9, 1940
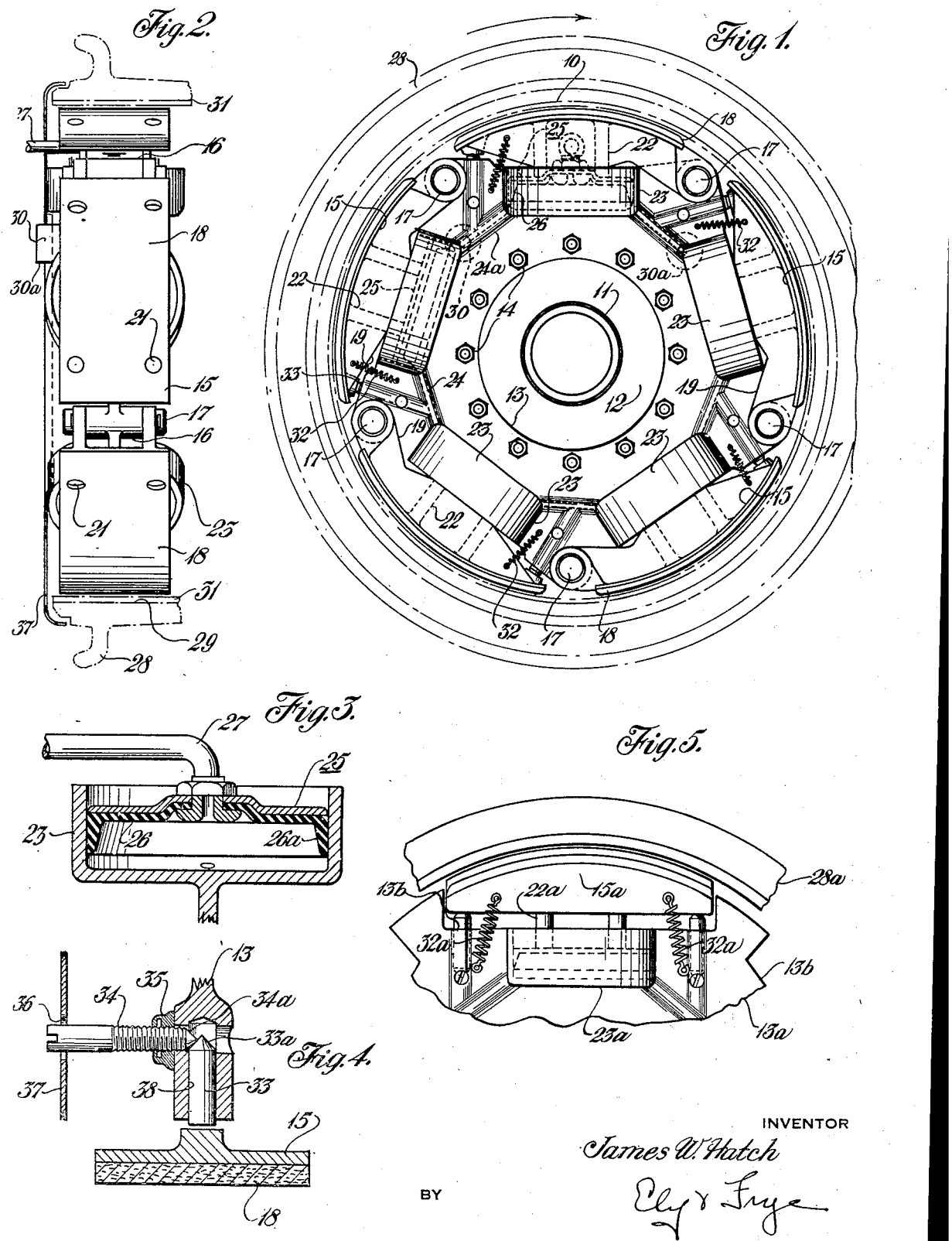
INVENTOR
James W. Hatch
BY Ely & Frye
ATTORNEYS Patented July 20, 1943

2,324,979

UNITED STATES PATENT OFFICE 2,324,979

AIRPLANE BRAKE

James W. Hatch, Akron, Ohio, assignor to The Firestone Tire & Rubber Company, Akron, Ohio, a corporation of Ohio Application April 9, 1940, Serial No. 328,677

4 Claims. (Cl. 188—152)

This invention relates to improvements in braking construction, more especially to an improved brake construction for use in airplanes.

In the construction of airplane brakes, the weight thereof is obviously of appreciable importance, so that a minimum weight brake is desired. The problem of designing a suitable minimum weight brake is complicated by the fact that airplane brakes are subject to severe braking stresses when used, so that a satisfactory brake must be able to stand relatively high braking stresses, without failure or overheating occurring.

One object of the present invention is to provide a novel airplane brake structure which is of low weight, but which is of sturdy, heat-resistant construction.

Another object of the invention is to provide a novel brake which has a plurality of brake shoes therein and which is adapted to utilize all of the brake shoes substantially evenly.

The above and further objects will be manifest from the following specification.

The present invention will be described with particular reference to the accompany drawing, of which:

Figure 1 is an elevation of an embodiment of the improved brake of the invention;

Figure 2 is a side elevation, with the wheel shown in dotted lines, of the brake of Figure 1;

Figures 3 and 4 are detailed sectional views of the bleeding and brake shoe adjusting devices, respectively, of the brake shown in Figure 1; and Figure 5 is a fragmentary elevation of a modified form of brake mechanism of the invention.

Referring specifically to Figure 1 of the drawing, a wheel assembly 10 is shown therein. The wheel assembly includes an axle 11 to which is secured a disc 12. A brake torque plate 13 is secured to the disc 12 by means of bolts 14. The brake torque plate 13 is preferably formed of a lightweight metal alloy, such as a magnesium alloy, which, although of light weight, is able to stand relatively high stresses per unit weight. To subject the brake torque plate 13 to a plurality of localized, relatively small stresses, a plurality of longitudinally arcuate brake shoes 15 are used in the wheel assembly 10, which brake shoes 15 are pivotally secured to integral axially extending bosses 16, formed at the periphery of the brake torque plate 13, by means of pins 17. The pins 17 extend through apertures formed in the extended ends of axially spaced reenforcing ribs 19 formed on the concave side of the shoes 15. Sections of any suitable brake lining 18 are secured to the brake shoes 15 by rivets 21. Preferably, inwardly extending bosses or arms 22 are formed integral with the ribs 19, or are otherwise secured to the concave surface of the brake shoes 15, which arms extend inwardly of the brake shoes and are adapted to control the radial position of the same in the manner hereinafter described.

Control means for effecting movement of the brake shoes 15 are formed on the brake torque plate 13 and include outwardly open, cup-shaped members, or flanges 23 that are formed at circumferentially spaced, local regions of the periphery of the brake torque plate. The bases of the cup-shaped members 23 are connected to each other by conduits 24 cored out of bosses 24a formed on the brake torque plate 13. The cup-shaped members are adapted to receive a fluid which is confined therein by metallic sealing discs or pistons 25 which are received in the cup-shaped members and which have rubber sealing discs 26 having annular flanges 26a extending therefrom vulcanized to, or other suitable sealing means associated with, the radially inward faces thereof. The discs or pistons 25 and sealing means 26 are so constructed and arranged that the unit formed thereby can be moved out of perpendicular relation to the members 23 without breaking the seal formed thereby or injuring the walls of the members. An incompressible fluid is received in the cup-shaped members 23 between the base of same and the rubber sealing discs 26, which fluid also fills the conduits 24. Figure 1 best shows that the arms 22 formed on the brake shoes 15 are in contact with the pistons 25 whereby any outward movement of same effects arcuate outward movement of the braking shoes relatively of the wheel assembly. In assembling the brake construction of the invention, it is important that the cup-shaped members and conduits connecting same are completely filled with incompressible fluid, and to this end a bleeder tube 27, having valve means (not shown) associated therewith, is connected to the piston 25 at the top of the wheel assembly 10. Hence, air can be bled from the system formed by the conduits 24 and the cup-shaped members 23, which system simultaneously is filled with incompressible fluid through inlets 30, connecting to the conduits, formed in protuberances 30a on the torque plate 13. Suitable valve and pressure means (not shown) are associated with the inlets 30 and connect to the inclosed system formed by the conduits 24 and cup-shaped members whereby fluid can be forced therein or removed therefrom, after the system is filled with fluid, so as to effect radially inward or outward movement of the piston 25. This, in turn, effects arcuate movement of the brake shoes 15 around the pins 17 on which they are pivoted.

The wheel assembly 10 is completely by provision of a wheel 28 that normally is journalled on the axle 11 and that has a cylindrical bore defined by a portion 29 at one edge thereof. An annular brake drum 31 is received in said bore and suitably secured to the wheel 28. The brake shoes 15 are designed so that the entire outer surface of the brake lining 18 will contact the brake drum 31 when the brake shoes are forced outwardly by the pistons 25. The normal position of the brake shoes 15 is controlled by pins 33 that are received in radially extending recesses 38 in the brake torque plate and bear on the under surface of the brake shoes, at their free ends remote from the pivots 17. The inner ends 33a of the pins 33 are tapered and engage with tapered ends 34a of adjusting screws 34. These screws 34 engage with tapered seats in the brake torque plate and are held in a given position by elastic stop anchor nuts 35. The screws 34 extend through holes 36 formed in an annular metal shield member 37 carried by the wheel 28. The brake shoes 15 normally are held radially inwardly relatively of the brake drum 31 by springs 32 which engage with the free ends of the brake shoes and extend between them and the brake torque plate. However, the radially inward position of each brake shoe is individually controlled by the adjusting screw 34 associated therewith. The brake is so arranged that rotation of the wheel 28 is from the free ends of the brake shoes 15 toward the pivoted ends thereof. This effects slight self-energization of the brake assembly of the invention.

A feature of the invention is that the brake shoes are all of standard construction, as the cup-shaped members and the piston received therein. Since the brake shoes are only in physical and removable contact with the pistons, it is relatively easy to assemble and disassemble the braking apparatus of the invention. Note that the cup-shaped members 23 are substantially as large in diameter as the shoes 15 are wide whereby a large pressure transmitting area is provided for the brake shoes. Use of a plurality of separately mounted brake shoes reduces the braking load applied to any portion of the brake torque plate whereby its construction may be altered appreciably, both in design and material, over usual construction to save weight but still to produce very satisfactory results.

In the modified form of the invention shown in Figure 5, there is provided a brake torque plate 13a, which may be slightly thicker than the plate 13, and which has a plurality of circumferentially spaced recesses 13b formed therein at the periphery thereof. The recesses 13b are in radial alignment with the cup-shaped members 23a but are outwardly spaced from same whereby brake shoes 15a can be received in the recesses with the arms 22a of the brake shoes extending into the cup-shaped members. These brake shoes are merely floated, or removably positioned in the recesses 13b between the brake torque plate 13a and the wheel 28a whereby they are free for pure radial movement with relation to the brake torque plate 13a. Spring means 32a extend between each end of the brake shoes 15a and the brake torque plate 13a whereby the brake shoes are constantly urged radially inwardly of the brake. However, outwardly directed pressure exerted on the brake shoes through the arms 22a will force the shoes into contact with the brake drum to effect braking action. Circumferential movement of the brake shoes is prevented by the substantially radially directed edges of the brake torque plate 13a defining the recesses 13b. Adjustable means, such as is shown in Figure 4, for controlling the radially inward positions of the brake shoes, is provided for each end of the brake shoes.

While a written description and illustration of several embodiments of the invention are comprised herein, it will be understood that further modifications can be made without departing from the scope of the invention as defined in the appended claims.

What is claimed is:

1. In a brake construction, a torque receiving member, a plurality of outwardly open cups carried by said torque receiving member at the outer periphery thereof, a metal sealing disc positioned in each of said cups, a rubber sealing member vulcanized to the inner face of each of said metal sealing discs, the assembly consisting of said metal sealing disc and said rubber sealing member being free to move slightly transversely of its axis without breaking the seal formed thereby, means connecting the base of each of said cups to the cups adjacent thereto, said cups and connected means adapted to receive fluid under pressure to force said metal sealing discs outwardly of said cups, a plurality of brake shoes, means pivotally securing one end of each of said brake shoes to said torque receiving member, said brake shoes being positioned to extend over the open sides of said cups and being provided with integral bosses that bear upon said metal sealing discs, means for retaining said brake shoes in contact with said metal sealing discs and adjustable means operatively associated with said torque receiving member for determining the radially innermost positions of said brake shoes.

2. In a brake construction, a lightweight torque receiving member, a plurality of outwardly open cups formed on said torque receiving member at the outer periphery thereof, a metal sealing disc positioned in each of said cups, a rubber sealing member vulcanized to the inner face of each of said metal sealing discs, the assembly consisting of said metal sealing disc and said rubber sealing member being capable of slight movement transversely of its axis without breaking the seal formed thereby, means connecting adjacent members of said cups together, said cups and connecting means adapted to receive incompressible fluid under pressure to vary the position of said sealing discs in said cups, a plurality of arcuate brake shoes of less than quadrant size, means pivotally securing one end of each of said brake shoes to said torque receiving member to distribute braking stresses thereover, said brake shoes being positioned to extend over the open sides of said cups, means for retaining said brake shoes in contact with said metal sealing discs and urging said brake shoes and said metal sealing discs inwardly of the brake and adjustable means carried by said torque receiving member for controlling the radially innermost positions of said brake shoes.

3. In a brake construction, a brake torque plate, a plurality of brake shoes pivotally secured to said torque plate at the periphery thereof, a plurality of outwardly open cup-like means associated with said brake torque plate at the periphery thereof and positioned under said brake shoes, sealing means received in said cup-like means and contacting said brake shoes, said sealing means being constructed and arranged to be slightly movable transversely of its axis without breaking the seal formed thereby, adjustable means for limiting the radially innermost position of said brake shoes carried by said brake torque plate, and means in said cup-like means for forcing said sealing means outwardly whereby said brake shoes are moved outwardly of the brake.

4. In a device of the character described, a fixed torque plate, and a wheel rotatably mounted in respect thereto, a brake drum mounted on the wheel, a plurality of outwardly open circumferentially spaced cylinders mounted on the torque plate, each said cylinder having floatably disposed therein a piston, fluid conducting means inter-connecting said cylinders and means for introducing fluid under pressure into said cylinders and through said conducting means, a plurality of guideways provided in said torque plate, said guideways being aligned with the cylinders, and a brake shoe disposed in each of said guideways, said shoes being free to move radially in respect to said drum while being constrained against circumferential movement in respect thereto, a pair of spaced arms carried by each of said shoes, said arms projecting into said cylinders with free ends abutting said pistons, spring means urging each of said shoes toward its associated piston, said means comprising a pair of tension springs connecting the shoes at points outwardly spaced from the arms to the torque plate, and pairs of spaced pins adjustably mounted on the torque plate to extend into said guideways adjacent opposite ends of the shoes to limit inward radial movement of each shoe.

JAMES W. HATCH.

CERTIFICATE OF CORRECTION.

Patent No. 2,324,979.  July 20, 1943.

JAMES W. HATCH.

It is hereby certified that error appears in the printed specification of the above numbered patent requiring correction as follows: Page 2, first column, line 3, strike out "ward"; line 7, for "completely" read --completed--; line 24, for "tapered" read --tapped--; and second column, line 55, claim 2, for "ef" read --of--; and that the said Letters Patent should be read with this correction therein that the same may conform to the record of the case in the Patent Office.

Signed and sealed this 7th day of September, A. D. 1943.

(Seal)

Henry Van Arsdale,
Acting Commissioner of Patents.